United States Patent [19]
Libert et al.
[11] Patent Number: 4,782,294
[45] Date of Patent: Nov. 1, 1988

[54] METHOD OF MEASURING VARIATION IN THE ELONGATION OF A VERY LONG MAGNETIZABLE ELEMENT OF SMALL TRANSVERSE DIMENSIONS, AND APPARATUS FOR IMPLEMENTING THE METHOD

[75] Inventors: Jean-Francois Libert, Condette; Eric Milhamont, Calais; Jean-Luc Canivet, Oye Plage; Jean-Patrick Vives, Calais, all of France

[73] Assignee: Les Cables de Lyon, Lyons, France

[21] Appl. No.: 16,780

[22] Filed: Feb. 20, 1987

[30] Foreign Application Priority Data

Feb. 27, 1986 [FR] France ............ 86 02738

[51] Int. Cl.[4] ............ G01B 7/04; B65H 61/00
[52] U.S. Cl. ............ 324/206; 33/127
[58] Field of Search ............ 324/172, 178, 179, 206; 33/127, 128; 235/103.5; 364/562; 377/24

[56] References Cited

U.S. PATENT DOCUMENTS

| | | | |
|---|---|---|---|
| 2,332,797 | 10/1943 | Hume | 80/56 |
| 2,580,934 | 1/1952 | Love et al. | 235/103.58 |
| 2,989,690 | 6/1961 | Cook | 324/34 |
| 3,466,535 | 9/1969 | Sterns et al. | 324/206 |
| 3,702,404 | 11/1972 | McDermitt | 304/172 X |
| 3,970,921 | 7/1976 | Ito | 304/206 X |
| 4,041,610 | 6/1976 | Uesgui et al. | 33/127 |
| 4,467,280 | 8/1984 | Uehara et al. | 324/206 |
| 4,560,928 | 12/1985 | Hayward | 324/172 |
| 4,641,093 | 2/1987 | Melgui et al. | 324/239 |

FOREIGN PATENT DOCUMENTS

| | | | |
|---|---|---|---|
| 466746 | 10/1981 | France . | |
| 186714 | 10/1966 | U.S.S.R. | 324/206 |
| 382915 | 7/1973 | U.S.S.R. | 324/206 |
| 1096564 | 6/1984 | U.S.S.R. | 324/206 |
| 1183829 | 10/1985 | U.S.S.R. | 324/206 |
| 952074 | 3/1964 | United Kingdom . | |

*Primary Examiner*—Gerard R. Strecker
*Attorney, Agent, or Firm*—Kenyon & Kenyon

[57] ABSTRACT

A method of measuring variation in the elongation of a very long element of small transverse dimensions and made of magnetizable material, optionally covered by non-magnetic material, and running between a lower elongation zone and a higher elongation zone, or vice versa, said method consisting in periodically magnetically marking the elongate element simultaneously at two points spaced apart by a predetermined distance therealong in a first one of said zones, and then in detecting the instants at which said magnetic marks pass at least one point situated in the other one of said zones.

9 Claims, 2 Drawing Sheets

METHOD OF MEASURING VARIATION IN THE ELONGATION OF A VERY LONG MAGNETIZABLE ELEMENT OF SMALL TRANSVERSE DIMENSIONS, AND APPARATUS FOR IMPLEMENTING THE METHOD

The invention relates to a method of measuring variation in the elongation of a very long element of small transverse dimensions and made of magnetizable metal, which element may optionally be covered in non-magnetic material, said element running from a zone of lesser elongation to a zone of greater elongation, or vice versa, the invention also applies to apparatus for implementing the method.

BACKGROUND OF THE INVENTION

This method and apparatus are particularly applicable to measuring variation in the elongation of an optical fiber cable core including grooves for housing optical fibers and subjected to tension which causes the core to lengthen elastically prior to having optical fibers inserted in its grooves. Thereafter the tension is released in order to obtain excess length of fiber in the grooves, thereby preventing the fibers from being subjected to elongation as severe as that to which the cable may be subjected after manufacture during handling operations and during laying. Grooved cores of this kind are described in published French patent specifications Nos. 2 312 788 and 2 544 874, with patent specification No. 2 544 874 being in the name of the Assignee. The invention also applies to measuring the elongation of wires or cables during manufacture.

When manufacturing optical fiber cables, and in particular submarine cables, it is necessary to allow for considerable traction forces which will be exerted on the cable while it is being laid and possibly also while it is being raised in order to perform a repair thereon. This is because optical fibers are capable of withstanding very little elongation without breaking (about 1% to 1.5%), whereas the plastic and metal items constituting the cable core and its armoring are likely to elongate much more during traction. It is thus necessary to provide excess optical fiber length within the cable so that the fibers themselves are put under traction as late as possible when the cable as a whole is elongated, as described in German patent specification No. 2 519 050.

In current versions of this type of cable, optical fibers are individually disposed in recesses which are formed (often helically) in the periphery of a core of plastic material provided with an axial metal cable reinforcing of strength member made of a steel having a high elastic limit. The recesses are wide enough and deep enough to allow the fibers to slide freely and even to take up an undulating path which is considerably longer than the length of the core.

This excess optical fiber length is obtained very simply by placing the fibers in their recesses in a zone of the manufacturing line where the grooved core is highly elongated under the effect of a traction force of several tens of kilograms. This force is then released and the grooved core returns to its initial length so that the length of fiber disposed in the recesses is greater than the length of the cable. As a result it is frequently possible to elongate such a cable by as much as 1.4% before the fibers themselves are subjected to a traction force.

It will readily be understood that it is most important to be able to accurately control said excess length during cable manufacture, since if too little excess length is provided then optical fibers may break when the cable is under traction, while if too much excess length is provided then both the cost and the attenuation of the cables suffer, in particular because of the manufacturing which is likely to occur in the fibers. Further, the measurement of core elongation must be performed as much as possible while the cable is moving during manufacture so as to be able to correct any defect that may occur before it is too late. Since it is very difficult to measure the length of the fibers themselves, measurements are performed on variations in the elongation of the central carrier including the grooved core between zones where it is subjected to little tension and zones where it is put under considerable tension in order to receive the optical fibers.

The present invention makes use of a technique whereby the very long element includes a magnetizable material which is marked by magnetizing said material. French Pat. No. 2 466 746 has already proposed using magnetic marking for measuring the length of running objects, such as tubes or metal cables, but this method is incapable of showing up small variations in length when measuring variations in elongation between a zone where a core is put under low tension and a zone where it is put under much greater tension, followed by a zone where the tension is released, and in particular when the very long element is subjected to non-uniform elongations as it moves.

British patent specification No. 2 131 553 proposes detecting unwanted elongation of a conveyor belt by comparing the distance between two magnetic marks applied to the belt with the fixed reference distance that ought to exist between said marks on the belt. However, this method only gives approximate results and is only applicable to a band or other analogous item running round a closed loop.

The aim of the present invention is to provide a method and an apparatus enabling variation in the elongation of a very long element to be measured with high accuracy and at a high frequency, when such variations in elongation are relatively small and non-uniform, and when the element in question is running along an open circuit in a manufacturing line.

SUMMARY OF THE INVENTION

The present invention provides a method of measuring variation in the elongation of a very long element of small transverse dimensions and made of magnetizable material, optionally covered by non-magnetic material, and running between a lower elongation zone and a higher elongation zone, or vice versa, said method consisting in periodically magnetically marking the elongate element simultaneously at two points spaced apart by a predetermined distance therealong in a first one of said zones, and then in detecting the instants at which said magnetic marks pass at least one point situated in the other one of said zones.

It preferably includes at least one of the following features:

the instants that the magnetic marks pass through said second zone are determined by means of a first detector and of a group of second detectors, with one of said second detectors being spaced from said first detector by a distance equal to the distance between the two marking points in the first zone;

the magnetic marking of the elongate element is controlled by a sensor disposed between the two marking points and responsive to the passage of marks applied to the elongate member by the trailing one of said two marking points, the distance between said trailing marking point and said sensor not being a submultiple of the distance between the two marking points, and said detectors being disposed in a position such that under expected worst case conditions of relative elongation it is impossible for two marks to occur simultaneously within the group of detectors;

the instants at which the magnetic marks pass through said second zone are detected at a plurality of points, and the distance between the two magnetic marks in each pair of magnetic marks is determined independently of the running speed through said zone and of variations in said speed by observing the various instants at which the marks pass a plurality of detectors and by resolving a system of non-linear equations relating the distances between the detectors and the time intervals between the instants that the marks pass said detectors;

the signals indicative of the passage of a mark being detected are filtered and then applied to a first circuit in which they are amplified to saturation, rectified, and then transformed into logic pulses, and to a second circuit in which they are subjected to lower amplification and are compared with a threshold voltage, with the signals from said second circuit being used to validate the signals from said first circuit, thereby eliminating interference signals.

The present invention also provides apparatus for measuring the variation in the elongation of a very long element of small transverse dimensions and made of a magnetizable material which may optionally be covered with a non-magnetic material, said very long member running between a lower elongation zone and a higher elongation zone, or vice versa, said apparatus comprising two marking members spaced apart at a predetermined distance in a first one of said zones, a member for causing said magnetic marking members to make magnetic marks simultaneously on said very long element, and magnetic detectors for observing the instants at which the marks pass through the other one of said zones.

The apparatus preferably includes at least one of the following features:

it includes detectors for detecting the instants at which the magnetic marks pass through said other zone, one of said detectors being in a fixed position and the other detectors being fixed relative to one another and movable as a group to a position which is adjustable by means of a micrometer screw;

the member for controlling the two magnetic marking members is a detector disposed between said two marking members at a point such that there is no possibility of the marks generated by one of the markers coinciding with the marks generated by the other marker, and wherein the detector is disposed in such a manner that regardless of the expected worst case conditions of variation in elongation, there is no possibility of two marks occurring simultaneously between the detectors in said group;

it includes a member for filtering the signals representative of the passage of a mark being detected; a first circuit for amplifying said filtered signals to saturation and for rectifying them, and then for generating a logic signal corresponding to a zero pass in the analog signal; a second circuit for amplifying said signals to a lesser extent and for comparing them with a threshold level; and means for validating or invalidating the signals from the first circuit as a function of the signals from the second circuit.

The marking members are generally constituted by inductor coils fed with pulse signals and placed in the immediate proximity of the very long running element. The detectors are then constituted by pickup coils likewise placed in the immediate proximity of the running element.

In the simplest case when operating at a constant running speed, let d(MA, MB) be the distance on the element between the marks generated by the marking members which are assumed to be disposed in a low-tension zone, and let d(mA, mB) be the distance between the marks as received by a detector in a higher tension zone, then the relative elongation is given by the equation:

$$Ar=(d(mA,\ mB)/d(MA,\ MB))-1$$

A similar equation would be obtained if the marking members were in a high tension zone at a distance d(MA, MB) apart and the detectors were in a lower tension zone where the marks would be d(mA, mB) apart:

$$Ar=(d(MA,\ MB)/d(mA,\ mB))-1$$

If the magnetic marking signal is a pulse signal having a bell-shaped curve (see FIG. 5), the signal detected by a pickup coil will be proportional to the flux variation $d\phi/dt$ induced in said coil by the passage of the magnetic mark, and it will have the waveform shown in FIG. 6. The zero pulses of the detected signal are used for triggering the pulses applied to the calculating member.

The apparatus in accordance with the invention is also designed so as to eliminate various sources of error which may have affected simpler prior art devices.

Firstly, the pulses detected and transmitted to the calculating members are capable of being confused with interference signals (electric sparks, unwanted crackle or discharges). In order to eliminate such interference signals, the detected pulses are compared after being highly amplified, clipped, and then differentiated, with signals conveyed by a parallel circuit operating at a much lower level (FIG. 7).

Further, the detected signals from a plurality of sensors are used by the calculating members in order to take account of variations in the running speed, said variations introducing non-linear terms into equations of the form:

$$d(L1,\ L2)=e(T2-T1)+f(T2-T1)^2+g(T2-T1)^3\ldots$$

which give the relationship between the distance separating two detectors and the time taken for a mark to pass from one detector to the next.

It will readily be understood that by combining information from a plurality of sensors (for example five), it is possible to set up enough equations to be able to calculate all of the parameters necessary for determining local variations in elongation at various points along the cable.

The marking coils and the pickup coils may be optimized in order to obtain the best signal/noise ratio. In particular, they may include magnetic cores, and their air gaps may be dimensioned in such a manner as to be relatively insensitive to interfering magnetic fields. It would also be possible to use pairs of magnetic coils situated on either side of the cable to be marked or read so as to obtan maximum signal.

BRIEF DESCRIPTION OF THE DRAWINGS

An embodiment of apparatus for measuring variation in the elongation in an optical fiber cable core between a low tension inlet zone, a high tension elongation zone, and a further low tension reception zone is described by way of example with reference to the accompanying drawings, in which.

MORE DETAILED DESCRIPTION

Figure 1:
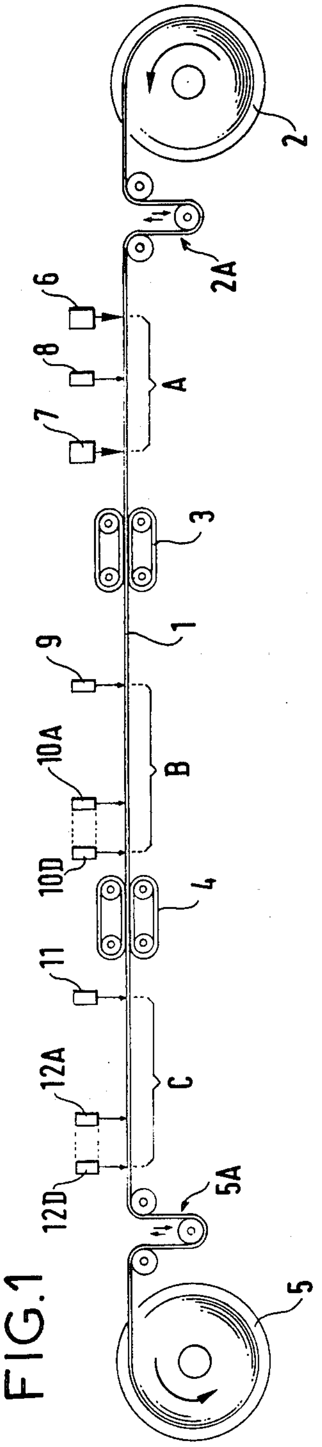
FIG. 1 is an overall diagram of the apparatus.

In FIG. 1 the core 1 is paid off from a drum 2 and is driven by a caterpillar-type linear capstan 3. A zone A between the drum 2 and the linear capstan 3 is under a low tension which is just sufficient to cause the core to advance. A bobbing tension adjuster 2A is situated between the pay-off drum 2 and the zone A.

After the linear capstan 3 there is a zone B running up to a second linear capstan 4, with the core being subjected to high tension in said zone B in order to elongate the core prior to laying optical fibers in its grooves. To this end, the second linear capstan 4 operates at a higher speed than the first linear capstan 3. The optical fibers are laid in the grooves of the core in this zone by conventional means, not shown.

After the second linear capstan 4, the core is again subjected to low tension as it passes through a zone C prior to being taken up on a take-up drum 5, thereby allowing the optical fibers to become somewhat slack in their grooves. A second bobbing tension regulator 5A is located between the zone C and the take-up drum.

The marking device is disposed in the first low tension zone A. It comprises two inductive marking coils 6 and 7 which are at a predetermined distance L apart, which distance is accurately determined (see FIG. 2). A detector coil 8 is disposed between these two marker coils and is located at predetermined distances 1 and (L−1) from the marking coils 6 and 7 respectively. The distance 1 is not a sub-multiple of the distance L, so as to avoid two consecutive marks being generated at the same location on the core.

The first detector device is disposed in the high tension zone B. It comprises an isolated detection coil 9 and a group of detection coils 10A, 10B, 10C, and 10D. The number of coils in the group may be less than or greater than four.

The distance between the isolated coil 9 and the coil 10B in the group of coils is chosen to be equal to the distance L between the marking coils 6 and 7.

The second low tension zone C is provided with a detector device analogous to that provided in the high tension zone B, and comprising an isolated detection coil 11 and a group of detection coils 12A, 12B, 12C, and 12D, with the distance between the isolated coil 11 and the coil 12B being equal to the distance between the marking coils 6 and 7.

In order to prevent from thermal expansion effects disturbing the measurements, the zones A, B, and C are disposed in a single workshop so as to ensure that their temperatures are substantially identical.

Figure 2:
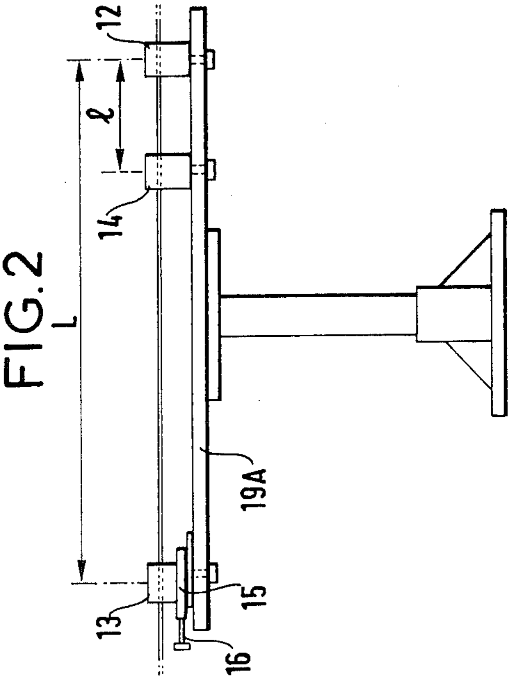
FIG. 2 shows an assembly for magnetically marking the strength member of the core.

In the first low tension zone A, the marking coils 6 and 7 and the detection coil 8 are disposed on supports 12, 13, and 14 mounted on a common longitudinal bar 19A (FIG. 2). The support 13 is mounted on a sliding plate 15 whose position is accurately adjustable by means of a micrometer screw 16.

Figure 3:
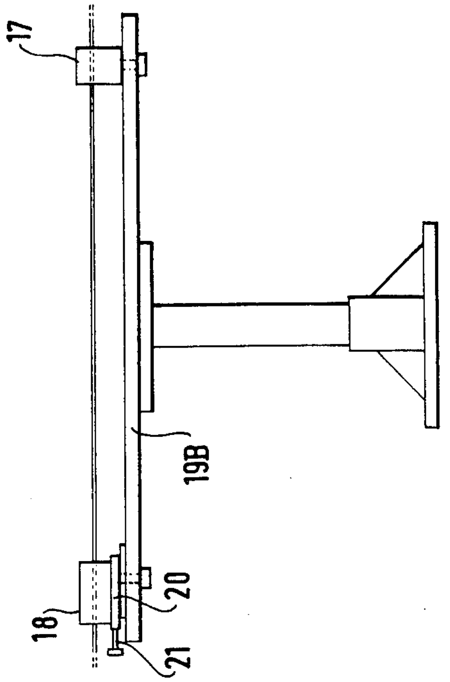
FIG. 3 shows an assembly for detecting the passage of such magnetic marks.
Figure 4:
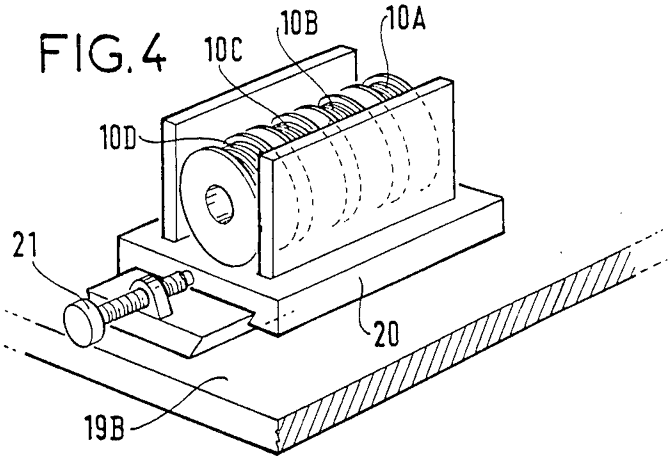
FIG. 4 is a perspective diagram showing the pickup coils and their micrometer adjustment member in greater detail.

In the high tension zone B, the isolated coil 9 and the group of coils 10A to 10D are disposed on respective supports 17 and 18 mounted on a common longitudinal bar 19B (FIG. 3). The support 18 for the group of coils 10A to 10D is mounted on a sliding plate 20 whose position is accurately adjustable by means of a micrometer screw 21. In order to avoid any inaccuracy that could occur from differential expansion, the bars 19A and 19B are both made of the same material. FIG. 4 is a view on a larger scale showing the group of coils 10A to 10D, together with their support plate 20 and the adjusting micrometer screw 21.

The distance between the end coils 10A and 10D of the group must be greater than the difference between the maximum expected elongation and the minimum expected elongation (i.e. between reading the distance between marks that occurs when zone B is under maximum possible tension while zone A is under minimum possible tension, and the equivalent distance which occurs when zone B is under its minimum possible tension while zone A is under its maximum possible tension). However, when a mark mA made by the coil 6 is detected by the isolated coil 9, the corresponding mark mB made simultaneously by the coil 7 must lie between the detectors 10A and 10D. One way of identifying the two marks mA and mB of the same pair of marks is to position the detector 8 so that regardless of the minimum and maximum limiting conditions in variation in elongation, two marks can never occur simultaneously within the group of detectors 10A to 10D.

Similar conditions apply to taking measurements in the second low tension or takeup zone C.

Initially the distance between the isolated coil 9 and the coil 10B in the group is adjusted to have the same value as the distance between the coils 6 and 7.

To this end, the coils 10A to 10D are at predetermined mutual distances apart and are fixed as a group to the support 18 which can be displaced using the micrometer screw 21. The same tension is then applied in both zones A and B and the micrometer screw is adjusted so that the detection signal from the coil 10B representative of one mark mB in a pair of marks occurs synchronously with the detection signal from the coil 9 of the other mark mA of the same pair, for example by using an oscilloscope synchronized on the detection signal from the coil 9.

The distances between the coils 10A and 10B, 10A and 10C, and 10A and 10D are then measured.

For example, once the position of the micrometer screw has been established for coil 10B, and while the tensions applied to the core still remain the same in both zones A and B, the screw may be turned to move the plate 20 so that a mark mA is detected by the coil 9 simultaneously with corresponding mark mB being detected by the coil 10A.

The distance between the coils is then equal to the difference between the two positions of the micrometer screw 21.

The coils 9, 10B, 10C, and 10D have respective counters (not shown) associated therewith, for a purpose described below.

The apparatus for measuring variation in elongation operates as follows:

At a given instant, a pulse is applied to the marking coils 6 and 7, thereby simultaneously generating magnetic marks on the running core 1. When the mark generated by the marking coil 6 reaches the detection coil 8, the detection coil triggers a new marking pulse, thereby causing the coils 6 and 7 to mark a new pair of magnetic marks.

For a given length L, the smaller the distance 1, the greater the number of pairs of marks which can be applied to a unit length of core. The marking time must be sufficiently short to avoid any uncertainty due to a magnetic mark spreading as it would if it existed for too long relative to the speed of cable displacement.

In the zone B under high tension, the arrival of the mark mB made by the coil 7 even with the first coil 10A in the group of coils causes the four conters corresponding to coils 10B, 10C, 10D and 9 to start counting. When the mark mB passes the coil 10B, the corresponding counter is stopped and records a time T1. Likewise, the counters associated with the coils 10C and 10D are stopped when the same mark mB passes the corresponding coils, thereby recording times T2 and T3 respectively. The other mark of the pair mA stops the counter corresponding to the coil 9 by passing said coil, thereby recording a time T4, which time T4 must be less than the time T3, as explained above. The distance d(mA, mB) between the marks mA and mB can then be determined using equations such as:

$$d(\text{coil } \mathbf{10A}, \text{coil } \mathbf{10B}) = f(T1)$$

$$d(\text{coil } \mathbf{10A}, \text{coil } \mathbf{10C}) = f(T2)$$

$$d(\text{coil } \mathbf{10A}, \text{coil } \mathbf{10D}) = f(T3)$$

$$d(mA, mB) = d(\text{coil } \mathbf{9}, \text{coil } \mathbf{10A}) + x1, \text{ where } x1 = f(T4).$$

This makes it possible to take account of variations in core running speed by expressing the distances as a function of the time intervals using polynomials such as:

$$d(\text{coil } \mathbf{10A}, \text{coil } \mathbf{10B}) = aT1 + bT1^2 + cT1^3$$

$$d(\text{coil } \mathbf{10A}, \text{coil } \mathbf{10C}) = aT2 + bT2^2 + cT2^3$$

$$d(\text{coil } \mathbf{10A}, \text{coil } \mathbf{10D}) = aT3 + bT3^2 + cT3^3$$

and $$x1 = aT4 + bT4^2 + cT4^3$$

This gives a system of three equations in three unknowns a, b, and c. The unknowns can therefore be determined and x1 can thus be deduced. Thereafter d(mA, mB) = d(coil 9, coil 10A) + x1.

Naturally, it would be possible to use terms in $T^4$ by adding an extra detector, however that makes the calculations considerably more complex without necessarily improving the accuracy of the final results.

Figure 5:
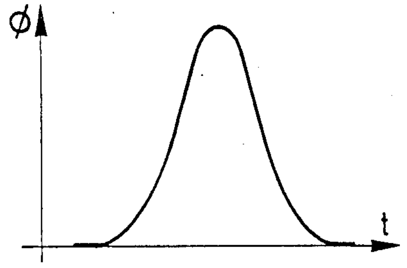
FIG. 5 is a waveform diagram of a magnetic marking signal.

FIG. 5 shows the waveform (amplitude as a function of time) of the magnetic marking signal from one of the coils 6 or 7 (a pulse in the form of a bell-shaped curve).

Figure 6:
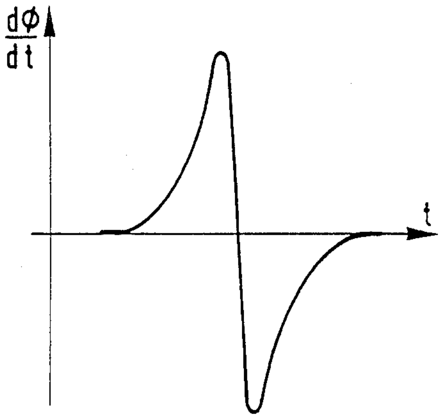
FIG. 6 is a waveform diagram of a detection signal.

FIG. 6 shows the waveform (amplitude as a function of time) of the signal given by a detection coil. This signal is proportional to the flux variation $d\phi/dt$ induced in said coil by the passage of the magnetic mark. The zero passes in this signal are used to trigger the pulses which are applied to the calculating members.

Figure 7:
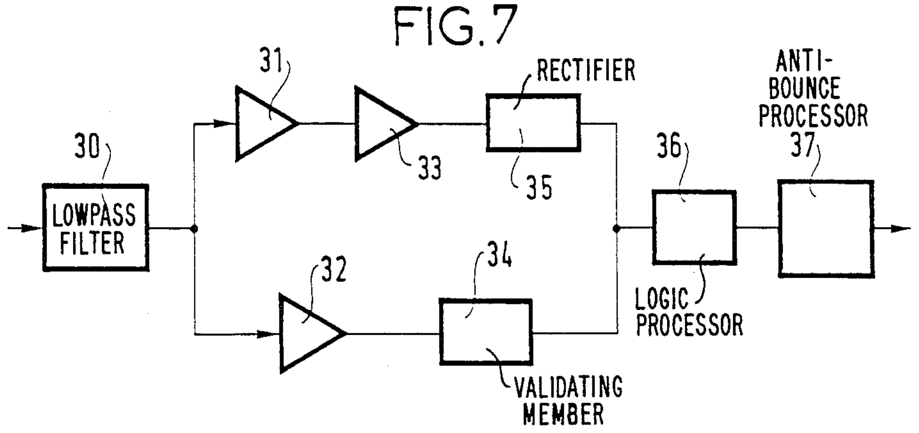
FIG. 7 is a block diagram of a circuit for comparison and calculation in order to determine variations in the elongation of the cable from the detection signals.

In order to avoid the signals resulting from the detection of magnetic marks being disturbed by interfering voltages resulting, for example, from electrical sparks, or from unwanted crackle or discharge, the signals from the detection coils should be applied to electronic circuit cards including signal-processing circuits of the type shown in FIG. 7.

After passing through a lowpass filter 30, the signals are processed by two parallel circuits. The first circuit amplifies them to saturation using two amplifiers 31 and 33 and then rectifies them at 35. As a result, the zero passes of each signal are represented by very short zero voltage pulses at the output from the circuit 35.

Since the gain is very high, any interference signal appearing in the circuit transmitting these signals could also give rise to very short zero voltage pulses.

In order to eliminate such interference, the second or "validation" circuits serves to validate a zero voltage pulse solely when it occurs simultaneously with the passage of a magnetic mark. To this end, the signal from the lowpass filter 30 is amplified by an amplifier 32, but less than in the parallel circuit, and saturation is not reached. It is therefore easy for a validating member 34 to compare the signal it receives from the amplifier 32 with voltage thresholds and thereby distinguish between a signal due to the passage of a mark and a signal due to interference. The validating member 34 allows zero pass pulses to reach a logic processor member 36 only when they are validated.

The logic processor circuit 36 delivers a logic signal corresponding to the zero pass of each validated analog signal. These signals are applied to an anti-bounce processor member 37 and are then processed by a calculating member in order to obtain data on variation in elongation, which data is both displayed and simultaneously recorded on tape.

The second detection device located in the second low-tension zone C is analogous to the device located in the high-tension zone B and serves to determine the positive or negative variation in elongation occuring in said zone C where the core containing optical fibers is allowed to relax.

We claim:

1. A method of measuring variation in the elongation of a very long element of small transverse dimensions and made of magnetizable material, the method comprising running the element through a first elongation zone in which a first elongation is imparted to the element and a second elongation zone in which a second elongation is imparted to the element, the elongation of the element being different in the second zone than in the first zone; periodically magnetically marking the elongate element simultaneously at two points spaced apart by a predetermined distance therealong in the first zone; detecting the instants at which said magnetic marks pass at least one point situated in the second zone; and providing in response to detecting the passage of said magnetic marks an indication of the variation in elongation of the element between the first and second zones.

2. A method according to claim 1, wherein the step of determining the instants that the magnetic marks pass at least one point in said second zone comprises detecting the instants at which said magnetic marks pass each one of a first point and of a group of second points, with one of said second points being spaced from said first point by a distance equal to the distance between the two marking points in the first zone.

3. A method according to claim 2, wherein the step of magnetically marking the elongate element comprises sensing the passage of marks applied to the element at a location between the two marking points and controlling the marking in response to the passage of the trailing one of said two marking points, the distance between said trailing marking point and said sensing location not being a submultiple of the distance between the two marking points, and said sensing location being such that under expected worst case conditions of relative elongation it is impossible for two marks to occur simultaneously within the group of second detecting points.

4. A method according to claim 1, wherein the step of detecting the instants at which the magnetic marks pass at least one point in said second zone comprises detecting passage of said marks at a plurality of points, and the step of detecting further comprises observing the various instants at which the marks pass a plurality of detecting points and resolving a system of non-linear equations relating the distances between the plurality of detecting points and the time intervals between the instants that the marks pass said detecting points and such that the distance between the two magnetic marks in each pair of magnetic marks is determined independently of the running speed through said second zone and of variations in said speed.

5. A method according to claim 1, wherein the detecting step further comprises filtering the signals indicative of the passage of a mark being detected, then amplifying the filtered signals to saturation, rectifying the saturated signals, and then transforming the rectified signals into logic pulses, separately amplifying the same filtered signals to lower amplification, comparing the lower amplified signals with a threshold voltage, and validating the logic pulses from said saturated signals with said compared lower amplification signals, thereby eliminating interference signals.

6. Apparatus for measuring the variation in the elongation of a very long element of small transverse dimensions and made of a magnetizable material, said apparatus comprising means for running the very long member through a first elongation zone in which a first elongation is imparted to the element and a second elongation zone in which a second elongation is imparted to the element, the elongation of the element in the second zone being different from the elongation of the element in the first zone, two marking members spaced apart at a predetermined distance in the first zone, a member for causing said magnetic marking members to make magnetic marks simultaneously on said very long element, magnetic detectors located at preselected points in the second zone for detecting the instants at which the marks pass said preselected points in the second zone; and means for processing signals from the magnetic detectors in response to passage of said magnetic marks to provide an indication of the variation in elongation of the element between the first and second zones.

7. Apparatus according to claim 6, wherein the detectors for detecting the instants at which the magnetic marks pass through said second zone comprise a first detector in a fixed position and the other detectors fixed relative to one another, and a micrometer screw for moving the other detectors as a group to a position which is adjustable.

8. Apparatus according to claim 7, further comprising a member for controlling the two magnetic marking members, said member comprising a sensor disposed between said two marking members at a point such that there is no possibility of the marks generated by one of the marking members coinciding with the marks genmerated by the other marking member, and wherein the sensor is disposed in such a manner that regardless of the expected worst case conditions of variation in elongation, there is no possibility of two marks occurring simultaneously between the other detectors.

9. Apparatus according to claim 6, wherein said magnetic detectors comprise a member for filtering analog signals representative of the passage of a mark being detected; a first circuit for amplifying said filtered signals to saturation, for rectifying the saturated signals, and then for generating a logic signal corresponding to a zero pass in the rectified analog signal; a second circuit for amplifying said analog signals to a lesser extent and for comparing them with a threshold level; and means for validating or invalidating the logic signals from the first circuit as a function of the compared signals from the second circuit.

* * * * *

UNITED STATES PATENT AND TRADEMARK OFFICE
CERTIFICATE OF CORRECTION

PATENT NO. : 4,782,294

DATED : 1 November 1988

INVENTOR(S) : Jean-Francois LIBERT et al.

It is certified that error appears in the above-identified patent and that said Letters Patent is hereby corrected as shown below:

| Column | Line | Correction |
|---|---|---|
| 1 | 52 | change "of" to --or--. (1st occurrence) |
| 2 | 5 | change "manufacturing" to --microbending--. |
| 7 | 28 | change "conters" to --counters--. |

Signed and Sealed this

Fourth Day of April, 1989

Attest:

DONALD J. QUIGG

*Attesting Officer*

*Commissioner of Patents and Trademarks*